(12) United States Patent
McGee et al.

(10) Patent No.: US 7,318,070 B2
(45) Date of Patent: Jan. 8, 2008

(54) METHOD AND APPARATUS FOR MAINTAINING COMPATIBILITY WITHIN A DISTRIBUTED SYSTEMS MANAGEMENT ENVIRONMENT WITH A PLURALITY OF CONFIGURATION VERSIONS

(75) Inventors: Jason Robert McGee, Apex, NC (US); Christopher C. Mitchell, Raleigh, NC (US); Leigh Allen Williamson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 497 days.

(21) Appl. No.: 10/799,301

(22) Filed: Mar. 11, 2004

(65) Prior Publication Data
US 2005/0203953 A1 Sep. 15, 2005

(51) Int. Cl.
*G06F 7/00* (2006.01)
*G06F 17/30* (2006.01)
*G06F 9/44* (2006.01)

(52) U.S. Cl. ............... 707/104.1; 707/10; 707/203; 717/168

(58) Field of Classification Search ............ 707/500 S, 707/104.1, 10, 203; 717/100 S, 168
See application file for complete search history.

(56) References Cited

U.S. PATENT DOCUMENTS

| | | | |
|---|---|---|---|
| 6,393,442 B1 | 5/2002 | Cromarty et al. ........... 707/523 |
| 6,480,860 B1 | 11/2002 | Monday ..................... 707/102 |
| 6,618,805 B1 * | 9/2003 | Kampe ......................... 713/1 |
| 2001/0037404 A1 | 11/2001 | Hafsteinsson et al. ...... 709/246 |
| 2001/0049743 A1 | 12/2001 | Phippen et al. ............. 709/237 |
| 2002/0002567 A1 | 1/2002 | Kanie et al. ................ 707/513 |
| 2002/0046235 A1 | 4/2002 | Foy et al. ................... 709/203 |
| 2002/0049790 A1 | 4/2002 | Ricker et al. ............... 707/513 |
| 2002/0069224 A1 | 6/2002 | Asai et al. .................. 707/513 |
| 2002/0083097 A1 * | 6/2002 | Warrington ................. 707/513 |

(Continued)

OTHER PUBLICATIONS

Marian et al., "Change-Centric Management of Versions in an XML Warehouse", Proceedings of the 27th International Conference on Very Large Databases, pp. 581-590, Sep. 11-14, 2001.

(Continued)

*Primary Examiner*—John Cottingham
*Assistant Examiner*—Kimberly Lovel
(74) *Attorney, Agent, or Firm*—Duke W. Yee; Martin J. McKinley; Gerald H. Glanzman

(57) ABSTRACT

A method, apparatus and computer instructions are disclosed for maintaining the compatibility of a multiple nodes in a distributed systems management environment with multiple configuration settings, by transforming the configuration data stored in the master repository (one possible realization is where XML documents contain the configuration data) from one version of the product to a previous version of the product. For multiple versions of the systems management environment, a transformation pipeline process (one possible realization of such a process may utilize XSLT) can be used by a "master" node to transform the configuration data multiple times for each version of the environment, until the configuration data has the format of the intended recipient "slave" node. Also, by performing the transformation process on the "master" side of the computing environment, "slave" nodes with older version configuration settings can continue to operate without having to upgrade their software applications in this regard.

4 Claims, 3 Drawing Sheets

U.S. PATENT DOCUMENTS

| | | | |
|---|---|---|---|
| 2002/0099735 A1 | 7/2002 | Schroeder et al. | 707/513 |
| 2002/0120652 A1 | 8/2002 | Rising, III et al. | 707/513 |
| 2002/0122054 A1 | 9/2002 | Hind et al. | 345/731 |
| 2002/0123993 A1 | 9/2002 | Chau et al. | 707/5 |
| 2002/0184269 A1 | 12/2002 | Imagou | 707/523 |
| 2002/0194220 A1 | 12/2002 | Sluiman | 707/513 |
| 2003/0014447 A1* | 1/2003 | White | 707/530 |
| 2003/0028521 A1* | 2/2003 | Teloh et al. | 707/3 |
| 2004/0010786 A1* | 1/2004 | Cool et al. | 717/170 |
| 2004/0123091 A1* | 6/2004 | Das | 713/2 |
| 2004/0205162 A1* | 10/2004 | Parikh | 709/219 |
| 2005/0055595 A1* | 3/2005 | Frazer et al. | 713/400 |
| 2005/0204347 A1* | 9/2005 | Jurkiewicz et al. | 717/137 |

OTHER PUBLICATIONS

Westfechtel et al., "A Layered Architecture for Uniform Version Management", IEEE Transactions on Software Engineering, vol. 27, No. 12, pp. 1111-1133, Dec. 2001.

Chien et al., "XML Document Versioning", SIGMOD Record, vol. 30, No. 3, pp. 46-53, Sep. 2001.

Chien et al., "Version Management of XML Documents", World Wide Web and Databases Third International Workshop WebDb 2000, pp. 184-200, May 18-19, 2000.

Chien et al., "Copy-Based Versus Edit-Based Version Management Schemes for Structured Documents", Proceedings Eleventh International Workshop on Research Issues in Data Engineering Document Management for Data Intensive Business and Scientific Applications, RIDE 2001, pp. 95-102, Apr. 1-2, 2001.

Rykowski, "Using Multiversion Web Servers for Data-Based Synchronization of Cooperative Work", Advances in Networked Enterprises Virtual Organizations, Balanced Automation, and Systems Integration IFIP TC//WG5.3 Fourth International Conference on Information Technology for Balanced Automation Systems in Manufacture and Transportation, pp. 131-140, Sep. 27-29, 2000.

Ciarlone, "Microstar's Near & Far Designer", Emedia Professional, vol. 11, No. 12, pp. 71-72, Sep. 2001.

Wang et al, Proceedings of the 1997 ACM SIGMOD International Conference on Management of Data, SIGMOD Record, vol. 26, No. 2, pp. 560-563, Jun. 2, 1997.

* cited by examiner

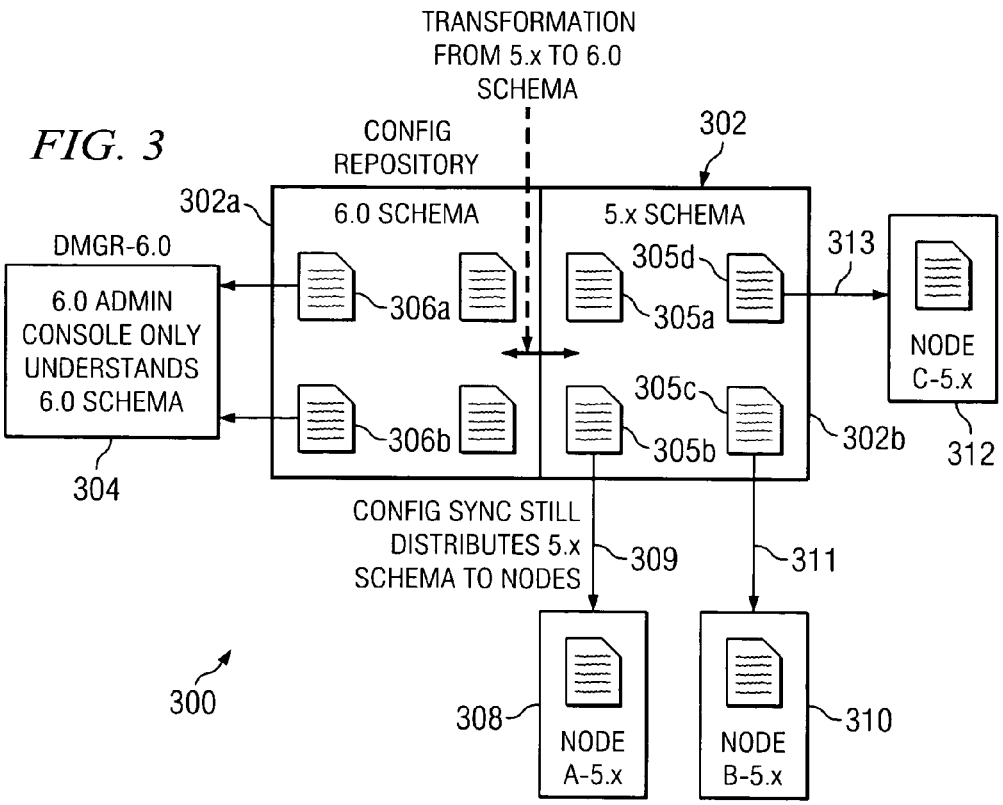
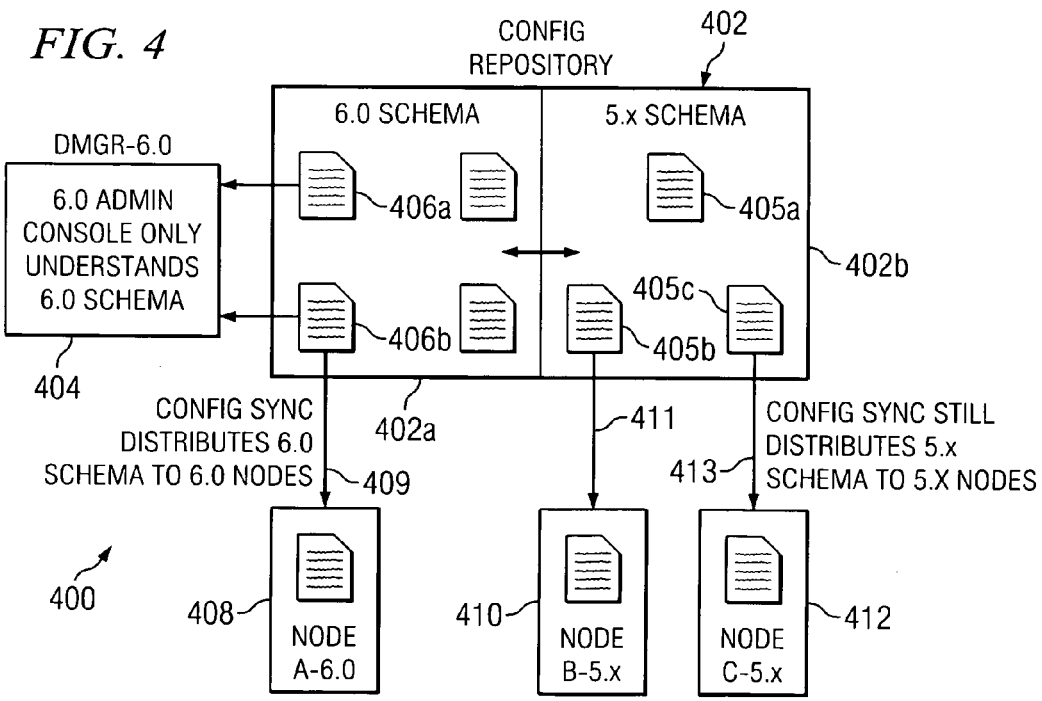

METHOD AND APPARATUS FOR MAINTAINING COMPATIBILITY WITHIN A DISTRIBUTED SYSTEMS MANAGEMENT ENVIRONMENT WITH A PLURALITY OF CONFIGURATION VERSIONS

RELATED APPLICATIONS

The present application is related by subject matter to commonly assigned, co-pending U.S. patent application Se. No. 10/800,067 entitled "METHOD FOR GENERATING XSLT DOCUMENTS FROM MULTIPLE VERSIONS OF A UML MODEL OR XML SCHEMAS CREATED FROM MULTIPLE VERSIONS OF A UML MODEL", filed on Mar. 12, 2004, and hereby incorporated by reference.

BACKGROUND OF THE INVENTION

1. Technical Field

The present invention relates generally to systems management in a dynamic electronic-business (e-business) network environment, and in particular, but not exclusively to, a method, apparatus and computer instructions for maintaining compatibility within a distributed systems management environment with a plurality of configuration versions.

2. Description of Related Art

The use of the Internet for business transactions has increased significantly in recent years. In fact, the term "e-business" has evolved to mean doing business on-line. WebSphere is a set of Java™-based tools developed by International Business Machines Corporation of Armonk, N.Y., which allows customers to create and manage relatively sophisticated e-business Web sites. The primary WebSphere tool is the WebSphere Application Server, which is a Java™-based, high-performance Web applications server that businesses can use to connect Web site customers with e-business applications.

In a distributed computing environment, such as, for example, the WebSphere 5.0 Network Deployment (ND) Applications Server, Java 2 Enterprise Edition (J2EE) product environment, a plurality of computing nodes (e.g., logical grouping of servers) are managed by an administrative facility that provides configuration settings for software applications being executed on the computing nodes. The configuration data for the WebSphere computing environment is stored in a master repository associated with the administrative facility and can be accessed as Extensible Markup Language (XML) documents.

A significant problem arises when different nodes in the computing environment are being operated with different versions of the WebSphere product, and the administrative facility synchronizes the nodes by sending configuration settings from the master repository to the nodes. The configuration settings "synched out" to the nodes can be for newer versions of the WebSphere product. Consequently, nodes configured with the older version settings are unable to operate with the format of the newer version configuration settings.

Therefore, it would be advantageous to have an improved method, apparatus and computer instructions for maintaining the compatibility of multiple nodes in a distributed systems management environment with multiple configuration settings, such as, for example, a WebSphere 5.x and/or 6.x Network Deployment (ND) Applications Server J2EE product environment.

SUMMARY OF THE INVENTION

The present invention provides a method, apparatus and computer instructions for maintaining the compatibility of a multiple nodes in a distributed systems management computing environment with multiple configuration settings, by transforming the configuration data stored in the master repository (one possible realization is where XML documents contain the configuration data) from one version of the product to a previous version of the product. For multiple versions of the systems management computing environment, a transformation pipeline process (one possible realization of such a process may utilize XSLT) can be used by a "master" node to transform the configuration data multiple times for each version of the environment, until the configuration data has the format of the intended recipient "slave" node. Also, in accordance with the present invention, by performing the transformation process on the "master" side of the computing environment, "slave" nodes with older versions of the configuration settings can continue to operate without having to upgrade their software applications in this regard.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram of an exemplary distributed systems management computing environment, which further illustrates principles of the present invention;

FIG. 4 is a block diagram of an exemplary distributed systems management computing environment is depicted, which further illustrates principles of the present invention.

DETAILED DESCRIPTION OF THE PREFERRED EMBODIMENT

Figure 1:
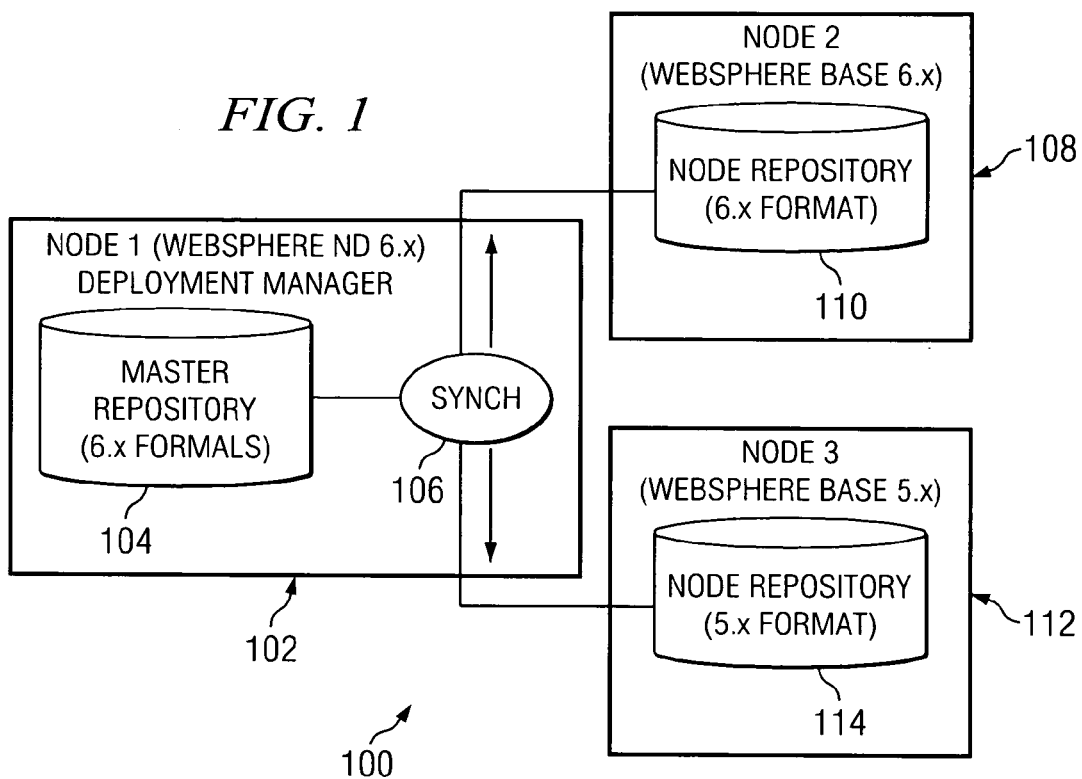
FIG. 1 is a block diagram of a distributed systems management computing environment that can be used to implement a preferred embodiment of the present invention.

With reference now to the figures, FIG. 1 depicts a block diagram of a distributed systems management computing environment that can be used to implement a preferred embodiment of the present invention. For this exemplary embodiment, the distributed systems management computing environment depicted in FIG. 1 can be a WebSphere Application Server or similar computing environment, such as, for example, a WebSphere 5.x and/or 6.x ND Applications Server J2EE product environment.

In the depicted example, distributed systems management computing environment 100 includes nodes 102, 108 and 112. For illustrative purposes and ease of understanding, only three such nodes are shown. In this regard, FIG. 1 is intended as an illustrative example, and not as an architectural limitation for the present invention. Appropriate network communications links are provided between nodes 102, 108 and 112. These communications links can include connections, such as, wire, wireless communication links, fiber optic cables, etc.

For this example, node 102 is configured to function primarily as a "master" node and network deployment manager, and nodes 108 and 112 are configured to function primarily as "slave" nodes. Node 102 includes master repository 104, which functions primarily as a data storage location for storing, in this case, XML configuration files. For this exemplary embodiment, as shown in FIG. 1, master repository 106 stores one or more versions of 6.x format XML schema configuration files. Also, each of nodes 108, 112 includes node repository 110, 114, respectively. For this exemplary embodiment, node repository 110 stores 6.x format XML schema configuration files, and node repository 114 stores 5.x format XML schema configuration files.

As such, it may be assumed that node 108 is configured to operate with version 6.x (e.g. "newer") settings, and node 112 is configured to operate with version 5.x (e.g., "older") settings. Also, for this exemplary embodiment, it may be assumed that node 102 is functioning as a network deployment manager, and in an administrative facility role, can synchronize nodes 108, 112 with respect to node 102 by sending configuration settings from master repository 104 to nodes 108, 112. The circle denoted as 106, and the flow lines from master repository 104 to nodes 108 and 112 illustrate such a synchronization (e.g., "synch") operation. As such, for this exemplary embodiment, it may be assumed that the configuration settings to be "synched out" to nodes 108, 112 are for a 6.x version of a WebSphere computing environment product. In other words, for this example, node 102 is attempting to upgrade the associated "slave" nodes (e.g., nodes 108, 112) to a newer version of a computing environment (e.g., WebSphere) product.

Figure 2:
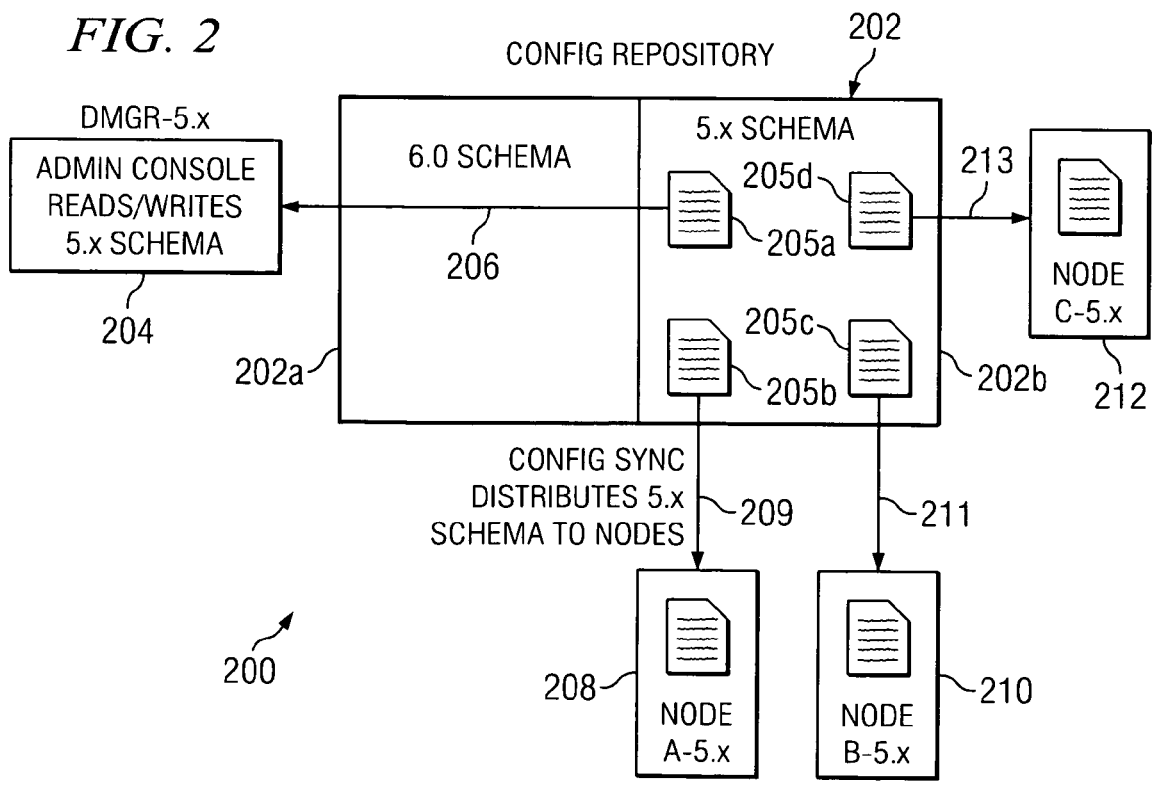
FIG. 2 is a block diagram of an exemplary distributed systems management computing environment that illustrates principles of the present invention.

Referring to FIG. 2, a block diagram of an exemplary distributed systems management computing environment is depicted, which illustrates principles of the present invention. For example, computing environment 200 can represent an essential part of a WebSphere Application Server or similar computing environment, such as, for example, a WebSphere Version 5.x version ND Applications Server J2EE computing environment that can be converted to a WebSphere Version 6.x ND Applications Server J2EE computing environment.

For this exemplary embodiment, computing environment 200 includes configuration repository 202, which functions primarily as a data storage location for configuration data, such as, for example, XML documents containing configuration data. As shown, configuration repository 202 can be partitioned to store at least two versions of configuration data. For this example, storage area 202a can be used for storing version 6.0 XML configuration files conforming to the 6.0 product's schema, and storage area 202b can be used for storing version 5.x (e.g., multiple versions of a 5.0 product) XML configuration files conforming to the 5.0 product's schema. In this regard, for illustrative purposes, a plurality of version 5.x XML schema documents (e.g., documents 205a-205d) are shown stored in storage area 202b.

Exemplary computing environment 200 also includes deployment manager 204. As such, deployment manager 204 and configuration repository 202 can represent a "master" node (e.g., node 102 in FIG. 1). In this regard, computing environment 200 further includes nodes 208, 210 and 212. For this illustrative example, nodes 208, 210 and 212 can represent "slave" nodes. As indicated by flow line 206, an administrative console component of deployment manager 204 can function to read (and write) configuration data (e.g., document 205a in 5.x format) from (and to) configuration repository 202. Also, it may be assumed (e.g., as indicated by flow lines 209, 211, 213) that deployment manager 204 is "synching out" XML schema files (e.g., documents 205b, 205c, 205d in 5.x format) to nodes 208, 210 and 212, respectively.

In this regard, computing environment 200 can represent an initial state during a configuration conversion operation for a computing environment, such as, for example, conversion of a WebSphere Version 5.x version ND Applications Server J2EE computing environment to a WebSphere Version 6.x ND Applications Server J2EE computing environment.

Referring now to FIG. 3, a block diagram of an exemplary distributed systems management computing environment is depicted, which further illustrates principles of the present invention. For example, with reference also to computing environment 200 shown in FIG. 2, computing environment 300 can represent a second state during a configuration conversion operation for a computing environment, such as, for example, conversion of a WebSphere Version 5.x version ND Applications Server J2EE computing environment to a WebSphere Version 6.x ND Applications Server J2EE computing environment.

For this example, computing environment 300 includes configuration repository 302. As shown, configuration repository 302 has been partitioned to store two versions of configuration files. Storage area 302a can store version 6.0 XML configuration data (e.g., XML documents conforming to 6.0 schema 306a, 306b), and storage area 302b can store version 5.x XML configuration data (e.g., XML documents conforming to 5.x schema 305a-305d).

Exemplary computing environment 300 also includes deployment manager 304, and nodes 308, 310 and 312. Similar to FIG. 2, deployment manager 304 and configuration repository 302 represent a "master" node, and nodes 308, 310 and 312 represent "slave" nodes. As indicated by flow line 306, an administrative console component (e.g., 6.0 administrative console component) of deployment manager 304 can read (and write) XML schema documents transformed to 6.0 form from (and to) configuration repository 302a. For this example, it may be assumed (e.g., as indicated by flow lines 309, 311, 313) that deployment manager 304 is still "synching out" configuration data in 5.x format (e.g., XML documents conformant to 5.x schema 305b, 305c, 305d) to 5.x nodes 308, 310 and 312, respectively.

At this point, it is important to note that the exemplary state shown in FIG. 3 represents a transformation of configuration data in 5.x format (e.g., XML documents conformant to 5.x schema) to 6.0 format (e.g., XML documents conformant to 6.x schema). For this example, the transformed configuration data in 6.0 format can be stored in storage area 302a (e.g., as 6.0 format XML documents 306a, 306b, etc.) as shown.

As such, an exemplary process for transforming configuration data in 5.x format to 6.0 format is disclosed in the above-described, related U.S. patent application No. entitled "METHOD FOR GENERATING XSLT DOCUMENTS FROM MULTIPLE VERSIONS OF A UML MODEL OR XML SCHEMAS CREATED FROM MULTIPLE VERSIONS OF A UML MODEL", which is incorporated by reference herein in its entirety.

Referring now to FIG. 4, a block diagram of an exemplary distributed systems management computing environment is depicted, which further illustrates principles of the present invention. For example, computing environment 400 can represent a third state during a configuration conversion operation for a computing environment, such as, for example, conversion of a WebSphere Version 5.x version ND Applications Server J2EE computing environment to a WebSphere Version 6.x ND Applications Server J2EE computing environment.

For this example, computing environment 400 includes configuration repository 402, which is shown as storing (e.g., transformed) version 6.0 configuration data (e.g., XML documents conformant to 6.0 schema 406a, 406b) in storage area 402a, and version 5.x configuration data (e.g., XML documents conformant to 5.x schema 405a-405c) in storage area 402b.

Exemplary computing environment 400 also includes deployment manager 404, and nodes 408, 410 and 412. Deployment manager 404 and configuration repository 402 represent a "master" node, and nodes 408, 410 and 412 represent "slave" nodes. However, different from node 308 in FIG. 3 (e.g., 5.x version node), node 408 now represents a 6.0 version node (e.g., having been configured for a version 6.0 WebSphere product). As shown, a 6.0 administrative console component of deployment manager 404 can read (and write) XML schema documents in 6.0 format from (and to) configuration repository 402a. For this example, it may be assumed (e.g., as indicated by flow lines 411, 413) that deployment manager 404 is still "synching out" XML configuration data in 5.x form (e.g., XML documents in 5.x format 405b, 405c) to the remaining 5.x nodes (e.g., nodes 410 and 412, respectively). Notably, different from the "earlier" state represented in FIG. 3, it also may be assumed (e.g., as indicated by flow line 409) for the state represented in FIG. 4, that deployment manager 404 is "synching out" XML configuration data in 6.0 form (e.g., XML document in 6.0 format 406b) as the initial upgrade of the 5.x nodes to 6.0 nodes. In other words, for this example, node 408 is being upgraded to a 6.0 node as the first upgrade in the series of 6.0 upgrades for the 5.x nodes.

Figure 5:
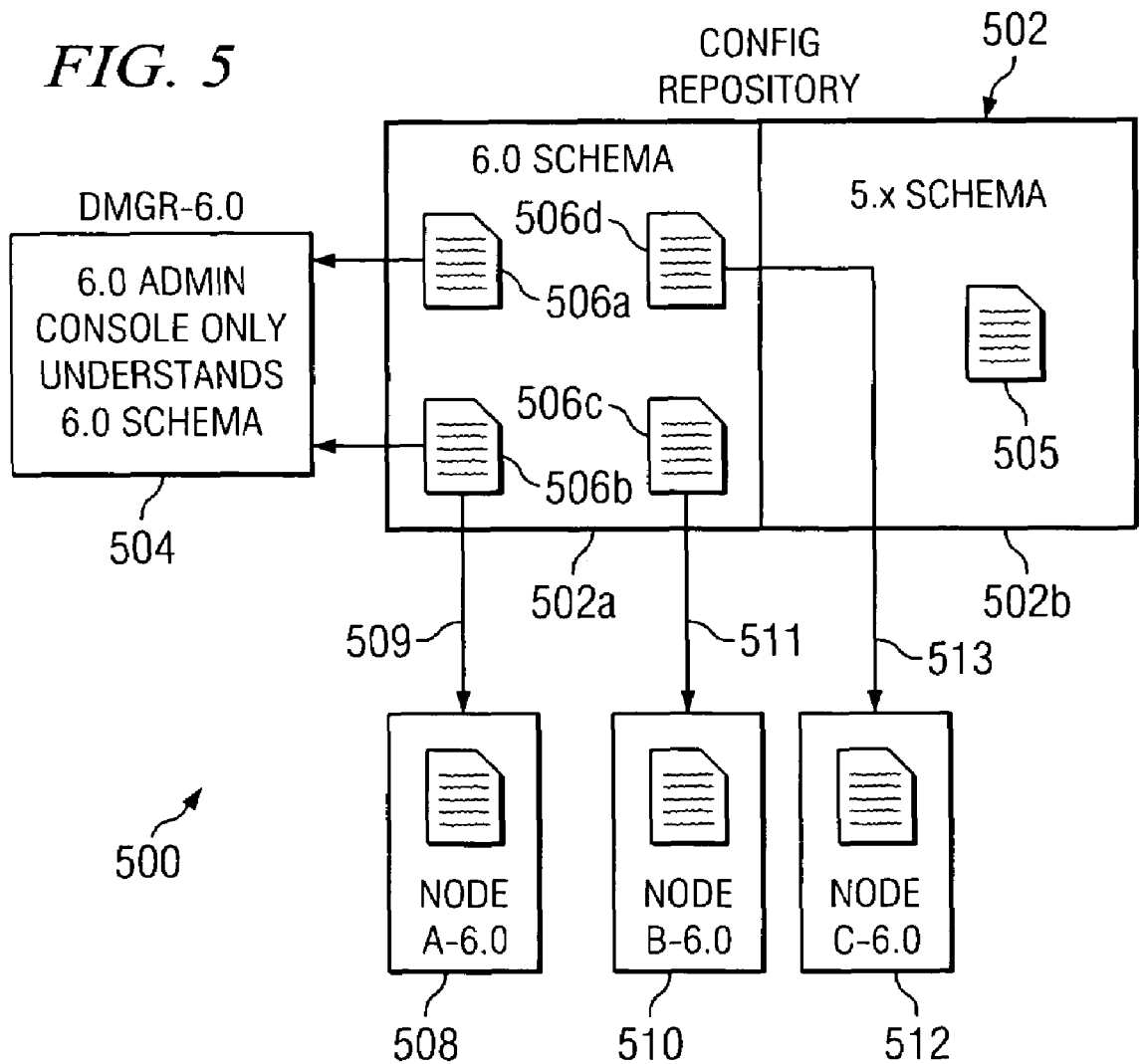
FIG. 5 is a block diagram of an exemplary distributed systems management computing environment, which further illustrates principles of the present invention.

Referring now to FIG. 5, a block diagram of an exemplary distributed systems management computing environment is depicted, which further illustrates principles of the present invention. For example, computing environment 500 can represent a fourth state during a configuration conversion operation for a computing environment, such as, for example, the computing environments represented in FIGS. 2-4. In this fourth state, it may be assumed that the remaining 5.x nodes (e.g., nodes 510, 512) of computing environment 500 are in the process of being converted to 6.0 nodes.

For example, configuration repository 502 of computing environment 500 is shown storing (transformed) version 6.0 configuration data (e.g., XML documents in 6.0 format 506a-506d) in storage area 502a, and version 5.x configuration data (e.g., XML documents in 5.x format 505) in storage area 502b.

Exemplary computing environment 500 also includes deployment manager 504 and nodes 508, 510 and 512. Deployment manager 504 and configuration repository 502 represent a "master" node, and nodes 508, 510 and 512 represent "slave" nodes. However, different from nodes 410 and 412 in FIG. 4 (e.g., 5.x version nodes), nodes 510 and 512 now represent 6.0 version nodes (e.g., in the process of being configured for the version 6.0 WebSphere product). Notably, for this example, it may be assumed at this fourth state (e.g., as indicated by flow lines 511, 513) that deployment manager 504 is now "synching out" XML configuration data in 6.0 format (e.g., XML documents in 6.0 format 506c, 506d) to the remaining nodes being configured (e.g., nodes 510 and 512) in computing environment 500. In other words, at this exemplary state, nodes 510 and 512 are being upgraded to 6.0 nodes as the remaining upgrades in the series of 6.0 node upgrades for what had been 5.x nodes.

It is important to note that while the present invention has been described in the context of a fully functioning data processing system or computing environment, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An apparatus to maintain compatibility between nodes within a distributed systems management environment, comprising:

a master node, said master node including a primary storage area, said primary storage area including at least two primary storage sections; and a plurality of slave nodes, each slave node of said plurality of slave nodes configured with a plurality of configuration settings having a first format, and each slave node of said plurality of slave nodes including a secondary storage area, wherein said master node is configured to:

read said plurality of configuration settings having said first format from a first primary storage section of said at least two primary storage sections;

transform said plurality of configuration settings having said first format to a plurality of configuration settings having a second format;

write said plurality of configuration settings having said second format to a second primary storage section of said at least two primary storage sections; and convey said plurality of configuration settings having said second format from said primary storage section to each said secondary storage area of said plurality of slave nodes, wherein said convey operation comprises a synch out operation; and wherein each said slave node of said plurality of secondary slave nodes is configured to:

receive said plurality of configuration settings having said second format; and reconfigure in accordance with said plurality of configuration settings having said second format, wherein said first format comprises a WebSphere version 5.x format, and said second format comprises a WebSphere 6.x format, and further wherein said plurality of configuration settings having said first format comprises at least one 5.x XSL schema document, and said plurality of configuration settings having said second format comprises at least one 6.x XSL schema document.

2. The apparatus of claim 1, wherein said primary storage area comprises a master repository, and said secondary storage area comprises a node repository.

3. The apparatus of claim 1, wherein said master node and said plurality of slave nodes comprise a plurality of data processing units.

4. The apparatus of claim 1, wherein said master node and said plurality of slave nodes comprise a plurality of servers.

* * * * *